G. D. DUDLEY.
Broiler.

No. 161,601.                  Patented April 6, 1875.

Witnesses.
John E. Crane
Stanley Mansfield

Inventor.
George D. Dudley

THE GRAPHIC CO. PHOTO-LITH. 39 & 41 PARK PLACE, N.Y.

UNITED STATES PATENT OFFICE.

GEORGE D. DUDLEY, OF LOWELL, MASS., ASSIGNOR TO EDWARD P. WOODS, DANIEL SHERWOOD, AND CYRUS H. LATHAM, OF SAME PLACE.

IMPROVEMENT IN BROILERS.

Specification forming part of Letters Patent No. 161,601, dated April 6, 1875; application filed February 19, 1875.

*To all whom it may concern:*

Be it known that I, GEORGE D. DUDLEY, of Lowell, in the county of Middlesex and State of Massachusetts, have invented a new and useful Improvement in Broilers or Toasters, of which the following is a full, clear, and exact description, reference being had to the accompanying drawings making part of this specification, in which—

Figure 1:
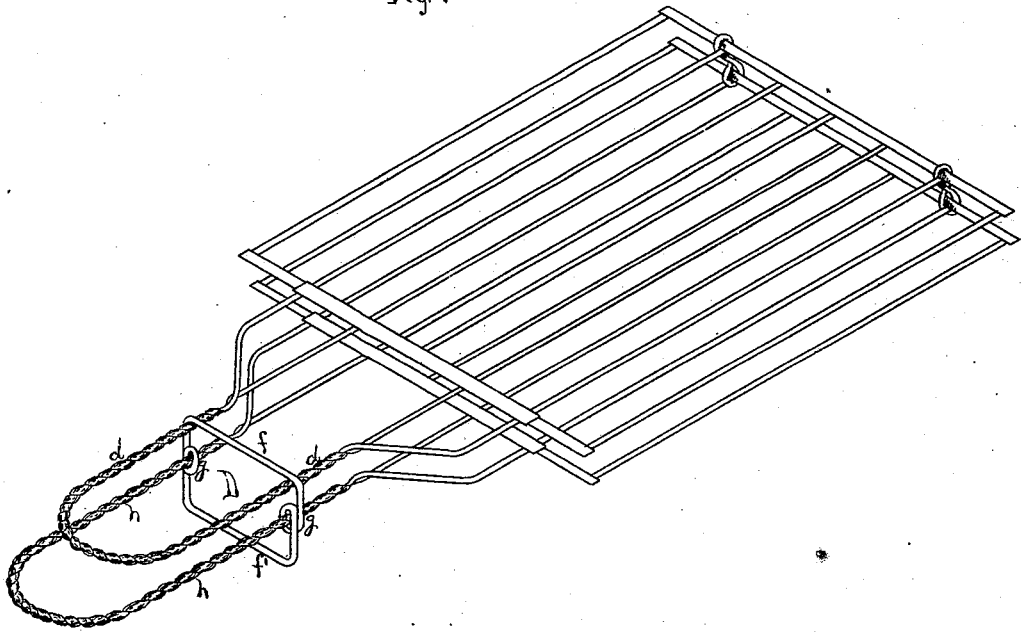

Figure 1 represents an isometrical projection of a broiler with my improvement thereunto applied. Figs. 2, 3, 4, and 5 represent detached details and certain modifications of my improvement.

This invention relates to broilers which are made in two parts, and which have hinge or link connections, and fold together upon and hold the substance placed between the two-barred wings thereof. It has for its object the sure and convenient means for securing the handles of the broiler in position, or of confining them together, and thereby holding the meat, bread, or other substance placed between the folding sides of the broiler, whether the broiler is folded together one way or the other, or any way within its folding capacity.

This invention consists of a double slide, D, constructed with eyes or guides $g$ and two opposite handle-securing loops, $f\,f'$, the eyes or guides $g$ encircling the two sides $h$ of one handle, and sliding thereon, and one or the other of the loops $f$ being always in position to pass over the opposite handle $d$ when the broiler is folded forward or backward, as the case may be.

The loop $f$ or $f'$ is always convenient for securing the handle $d$ by sliding over it, as shown in Fig. 1, the opposite loop being operative when the broiler is folded backward or in the opposite direction.

Figure 2:
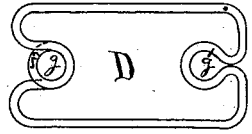

The modification shown in Fig. 2 is intended to render the slide easily applicable to the handle $h$ after the broiler is finished.

It will be observed that the looped eye or guide $g^1$ is open on the outer side, and if made of malleable material, as it ought, it can be opened to admit the handle, and afterward closed, so as to slide upon the handle.

The ends of the wire forming the guide at $g$ are bent so as to form guide-eyes to encircle the handle $h$ in opposite directions, and so lapping upon each other. By straightening out these ends $i$ the handle $h$ can be readily inserted, and the ends of the slide-wires again bent to re-form the guide-eyes and inclose the handle. Thus each of the guide-eyes at opposite ends of the slide encircles its branch of the handle $h$.

It will be readily seen that both ends of the slide may be made the same as at $g^1$ by allowing the end wires, which, in the drawing, and for convenience, met at the eye-guides, to meet at some other point, which may be closed by brazing or locking them together.

It will be readily seen that this slide may be of cast metal, made malleable, and both eyes formed as at $g^1$; or the openings in the guide-eyes to receive the handle, when so made of cast metal, made malleable, may be at the points where the guides come nearest to each other, instead of the points most remote, as may be most convenient.

When properly applied to the handle, this double or two-looped slide will be movable thereon, and will always be in position to secure the opposite handle $d$, whichever way the broiler is folded together.

Figure 3:
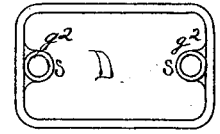
Figure 5:

The slide shown in Figs. 3 and 5 is intended to be applied before the handle-wires are fixed or secured, or while the broiler is being formed, and the long bearings S will furnish good supports for the slide, and cause it to move easily and steadily on the wires $h$, and without binding. This last-named slide may be made in a solid casting, or with tubes $g^2$, and soldered to the end wires.

Figure 4:
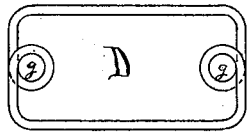

The slide shown in Figs. 1 and 4, or a slide like this, is made of a single piece of wire, bent in the form shown, and the two ends brought together and soldered, say at about the center, or in some part of one of the bars $f$.

Other modifications of the slide, or of the manner of making the slide, will readily suggest themselves to those accustomed to make or use such broilers.

The essential feature of my invention is the double or two-looped slide, operative to secure and hold the broiler when folded in either direction by simply moving the slide upon the handles, as described.

I claim—

The double or two-looped slide D, attached by eyes $g$ to the broiler-handle $h$, and presenting one of its loops in position to slide over the other broiler-handle, whichever way the broiler may be folded together, substantially as described.

GEORGE D. DUDLEY.

Witnesses:
JOHN E. CRANE,
STANLEY MANSFIELD.